United States Patent [19]

Hoffman

[11] Patent Number: 5,395,207

[45] Date of Patent: Mar. 7, 1995

[54] ARTICLE HANDLING DEVICE

[75] Inventor: Dalyn C. Hoffman, Augusta, Mich.

[73] Assignee: The Upjohn Company, Kalamazoo, Mich.

[21] Appl. No.: 28,827

[22] Filed: Mar. 10, 1993

[51] Int. Cl.⁶ .............................................. B65B 35/58
[52] U.S. Cl. ................................. 414/798.4; 53/446; 53/544; 414/761; 414/798.7
[58] Field of Search ................... 53/446, 544; 198/429, 198/430; 414/761, 765, 767, 798.4, 798.7

[56] References Cited

U.S. PATENT DOCUMENTS

| | | | |
|---|---|---|---|
| 2,069,503 | 2/1937 | Peyser | 226/4 |
| 3,143,223 | 8/1964 | McIntyre et al. | |
| 3,208,604 | 9/1965 | Taylor et al. | 414/798.7 |
| 4,672,795 | 6/1987 | Alexander et al. | 414/798.4 X |
| 4,829,863 | 5/1989 | Milholen | 83/23 |

FOREIGN PATENT DOCUMENTS 835239  5/1960  United Kingdom .

Primary Examiner—Michael S. Huppert
Assistant Examiner—Janice L. Krizek
Attorney, Agent, or Firm—Flynn, Thiel, Boutell & Tanis

[57] ABSTRACT

An article handling device for handling identical articles having one end that is thicker than the other end entering the device along a supply path containing a plurality of identically aligned articles wherein the leading end of each article is of the same thickness. The article handling device effects a dividing of a specified number of articles entering a transfer section into two groups, a first group being transferred directly to an exit section, a second group being transferred directly to a reversing section while a still further third group, previously transferred to the reversing section and reversed in orientation relative to the first and second groups, is transferred from the reversing section to the exit section. The first and third groups of articles are thereafter united as the orientation of the second group is reversed. The united first and third groups form a solid rectangular volume which can be easily packaged with no wasted space.

17 Claims, 11 Drawing Sheets

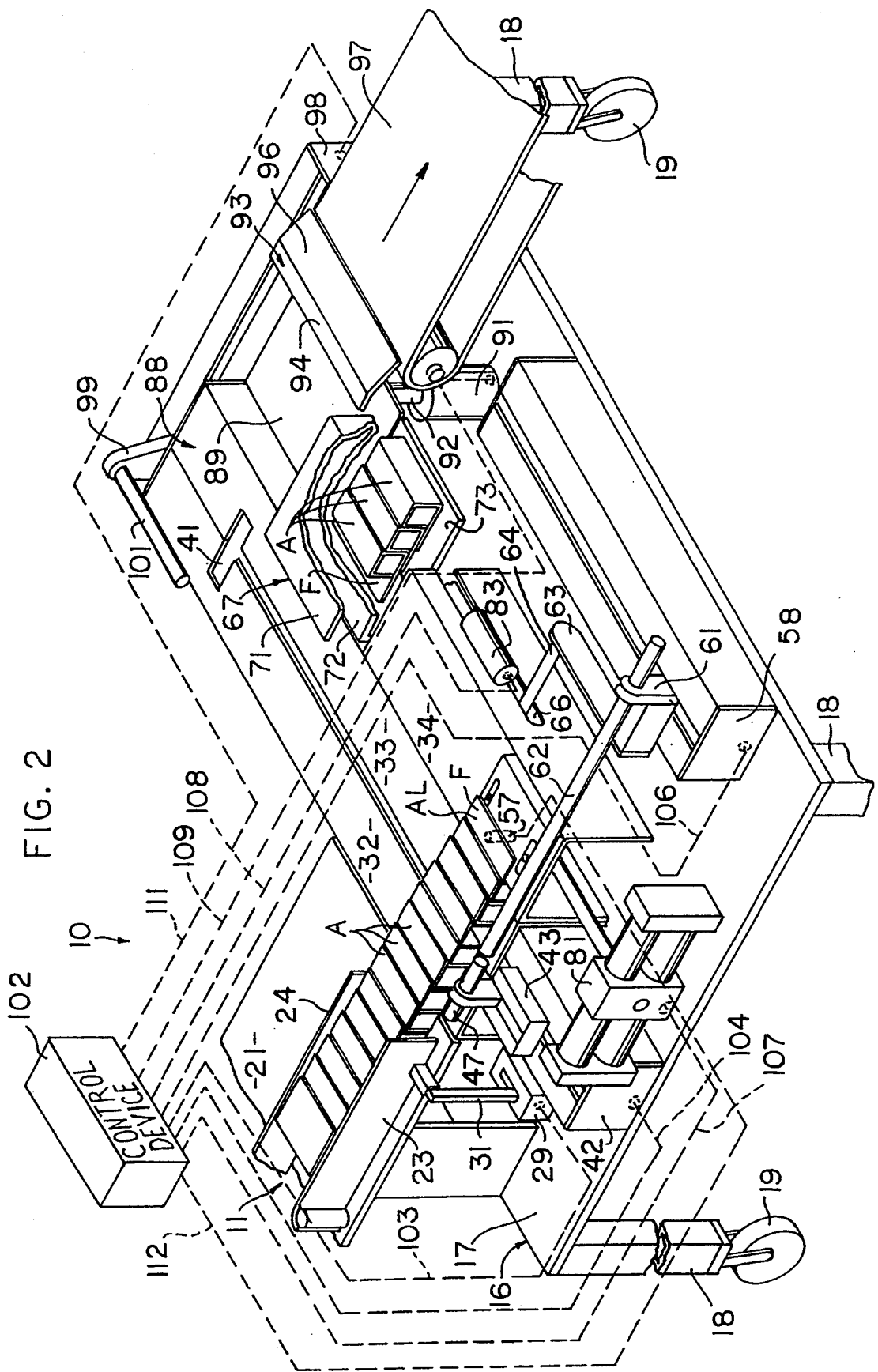

ARTICLE HANDLING DEVICE

FIELD OF THE INVENTION

This invention relates to an article handling device and, more particularly, to a device for assembling articles in sequence with alternate articles in reversed position.

BACKGROUND OF THE INVENTION

It is customary to market pharmaceutical products in paste form in manually collapsible tubes which can be squeezed or collapsed for purposes of causing the paste to exit an outlet nozzle in the tube. Such tubes are usually placed into elongated cartons which are generally square in cross section and have a planar flap or extension that is coplanar with one of the walls of the carton extending laterally from the carton. Generally, the width and length dimensions of the flap correspond to the width and length dimensions of the wall of the carton. Machines for packaging the tubes into such cartoning are well known and do not formulate a part of the invention disclosed herein.

As cartons containing the tubes exit a tube packaging machine, they are generally moved along a path so that the container portion of the carton abuts up against the next adjacent and leading carton with the flap on the rear one of the cartons overlapping the container portion of the next adjacent leading carton. It is generally the desire of the pharmaceutical company to package the tube containing cartons into units of, for example, one-half dozen, which units are wrapped in a clear transparent foil wrapping before being placed into a shipping container. The flap on the leading most carton causes a substantial waste of space in the shipping carton since the clear wrapping foil will prevent occupancy of an available space by an adjacent carton.

Accordingly, it is an object of this invention to provide an article handling device which will manipulate a series of product containing cartons to orient them so that a flap on a leading carton will be reversed to overlap the container portion on the next following carton and vice versa.

It is a further object of the invention to provide an article handling device, as aforesaid, which is easily transported from one packaging machine to another to enable the article handling device to be utilized in a variety of environments and to handle different size packaging and the like exiting a tube packaging machine.

It is a further object of this invention to provide an article handling device, as aforesaid, which is capable of handling a plurality of such cartons and manipulating them so that all of the flaps on a selected plurality of cartons are simultaneously reversed so the flaps thereof overlap the container portions of the next following plurality of cartons.

It is a further object of this invention to provide an article handling device, as aforesaid, which includes structure for efficiently handling the cartons to be manipulated to thereby enhance the speed of operation of the article handling device.

It is a further object of the invention to provide an article handling device, as aforesaid, which can be easily oriented between the exit location of a tube packaging machine and an entrance to an area whereat units containing a plurality of such cartons can be placed into a shipping carton.

SUMMARY OF THE INVENTION

In general, the objects and purposes of the invention are met by providing an article handling device for handling identical articles having one end that is thicker than the other end entering the device along a supply path containing a plurality of identically aligned articles wherein the leading end of each article is of the same thickness. The article handling device effects a dividing of a specified number of articles entering a transfer section into two groups, a first group being transferred directly to an exit section, a second group being transferred direct to a reversing section while a still further third group, previously transferred to the reversing section and reversed in orientation relative to the first and second groups, is transferred from the reversing section to the exit section. The first and third groups of articles are thereafter united as the orientation of the second group is reversed. The united first and third groups form a solid rectangular volume which can be easily packaged with no wasted space.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 2 is an isometric view similar to FIG. 1, but showing the cartons to be manipulated positioned on the device;

DETAILED DESCRIPTION

Figure 1:
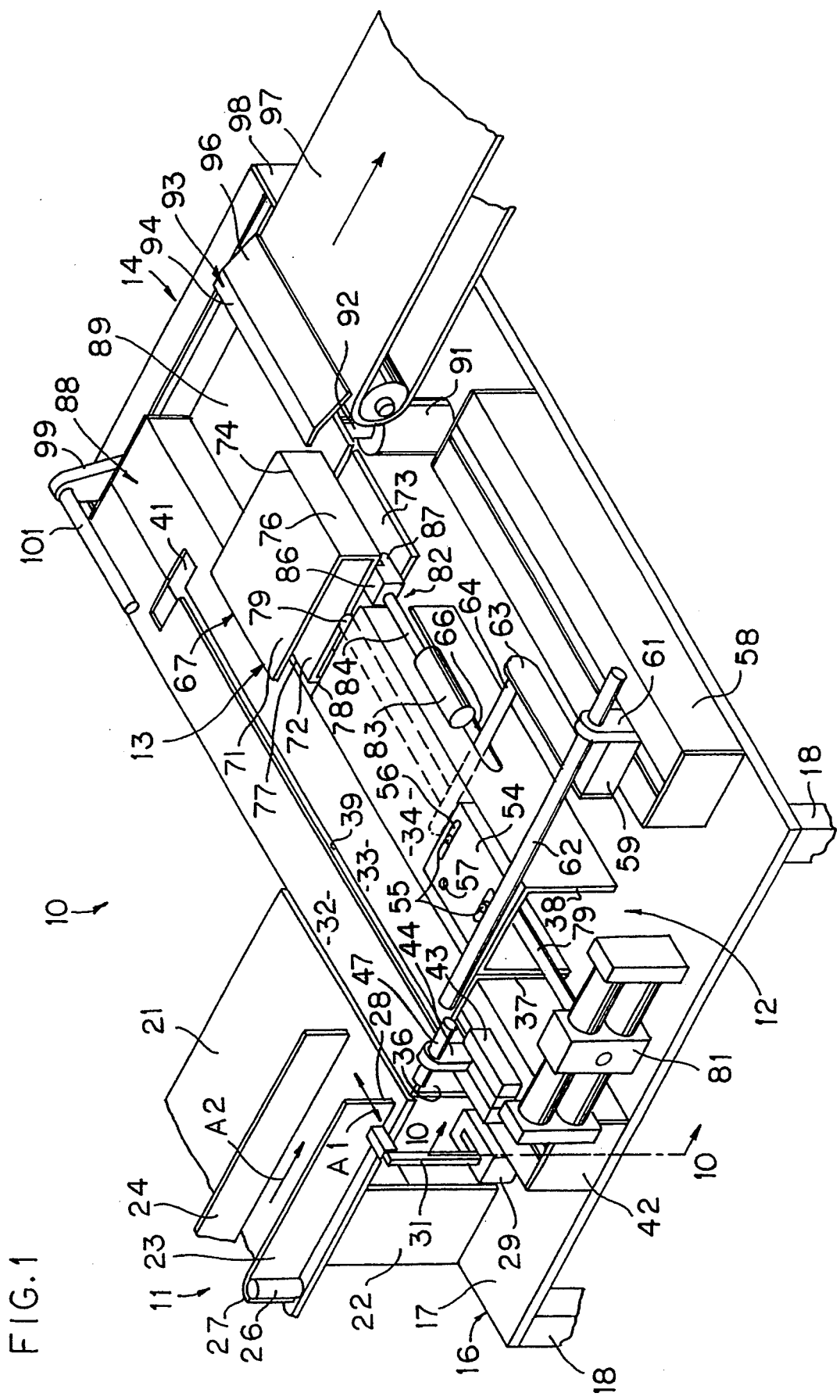
FIG. 1 is an isometric view of an article handling device embodying the invention.

Certain terminology will be used in the following description for convenience in reference only and will not be limiting. The words "up", "down" "right" and "left" will designate directions in the drawings to which reference is made. The words "forwardly" and "rearwardly" will refer to the directions of movement of the articles through the device, "forwardly" being the normal direction of movement of an article from the entrance to the device to the exit from the device. The words "in" and "out" will refer to directions toward and away from, respectively, the geometric center of the device and designated parts thereof. Such terminology will include the words above specifically mentioned, derivatives thereof and words of similar import.

An article handling device 10 embodying the invention includes an entrance section 11, an article transfer section 12, an article reversing section 13 and an exit section 14. The article handling device 10 is supported on a frame 16 which includes a base plate 17 mounted on a plurality of legs 18, the lower ends of which legs have floor engaging wheels 19, such as is illustrated in FIG. 2. It is preferable that the wheels be of the castering variety to facilitate easy manipulation of the frame 16 from one location to another and lockable to fix the location of the frame 16 relative to other structure.

The entrance section 11 includes a platform 21 supported on a pedestal 22 mounted on the upper surface of the base plate 17. A pair of laterally spaced upstanding guide rails 23 and 24 are provided on the upper surface of the platform 21. The guide rail 24 is fixedly secured relative to the platform 21 whereas the guide rail 23 is anchored to the upper surface of the platform 21 at one end thereof as by an upstanding post 26 which is fixedly secured to both the platform 21 and the adjacent end 27 of the guide rail 23. Thus, the end 28 of the guide rail 23 remote from the end 27 is movable back and forth in a direction corresponding with the direction of the arrow A1. In order to accomplish the aforesaid back and forth movement, a reciprocal actuator 29 is mounted to the upper surface of the base frame 17, an upstanding rod 31 thereof being fastened to the guide rail 23 adjacent the end 28 thereof so that reciprocal movement of the actuator 29 will cause a corresponding movement of the rod 31 and end 28 of the guide rail 23 along a path defined by the arrow A1. That is, the upstanding rod 31 will move while in the upright position lengthwise of the actuator 29 in a direction generally parallel with the pathway defined by the arrow A1. Articles that are to be manipulated by the article handling device 10 enter the entrance section 11 and travel between the guide rails 23 and 24 and in the general direction indicated by the arrow A2.

Figure 10:
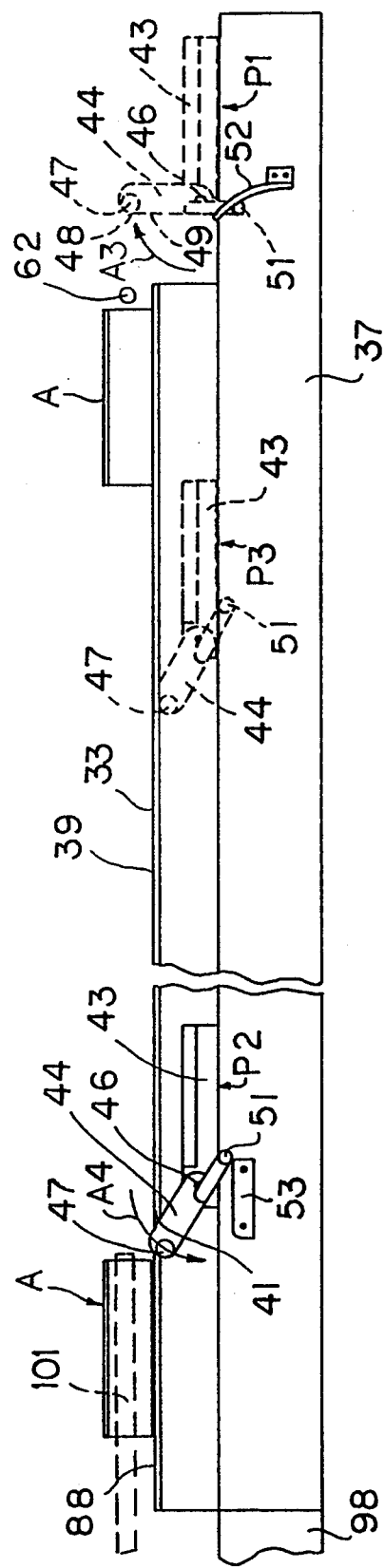
FIG. 10 is a sectional view taken along the line 10—10 of FIG. 1.

The article shuttling or transfer section 12 includes several platforms 32, 33 and 34 that are coplanar with each other. Each of the platforms 32, 33 and 34 are spaced from the top of the base frame 17 by leg structures as at 36, 37 and 38. The platform surfaces 32 and 33 have a gap 39 therebetween, the leftmost end of the gap 39 being open whereas the rightmost end of the gap 39 terminates in an enlarged rectangular opening 41. An elongated reciprocal actuator 42 is mounted on the upper surface of the base plate 17 and so that a portion of the left end (FIG. 1) is exposed and the right end extends beneath the platform surfaces 32 and 33 and particularly is centered under the gap 39 and opening 41. The reciprocal actuator 42 includes a carriage 43 thereon that, upon actuation of the actuator 42, is moved lengthwise of the actuator beneath the surfaces of the platforms 32 and 33. The carriage 43 has an upstanding post mechanism 44 pivotally secured thereto for movement about a generally horizontally extending axle 46 (FIG. 10). An elongated rod 47 is connected adjacent the upper end of the post 44, the longitudinal axis of the rod extending generally parallel with the pathway represented by the arrow A2. In this particular embodiment, and as best shown in FIG. 10, the leftmost surface 48 of the rod 47 is coplanar with the leftmost surface 49 of the upstanding post 44, it being recognized that the aforesaid leftmost surfaces 48, 49 are on the right side of the post 44 and rod 47 illustrated in FIG. 1. The lower end of the post 44 includes a bracket 51 extending beneath the axis of the horizontally extending axle 46. A post uprighting bracket 52 is secured to the supporting leg 37 by any conventional means and is adapted to engage the bracket 51 on a movement of the carriage 43 to its rightmost position illustrated in FIG. 10 (leftmost position illustrated in FIG. 1) to cause the post 44 to be rotated clockwise in the direction of the arrow A3 and to its upright position. Movement of the carriage 43 from an initial position P1 to the left in FIG. 10 (right in FIG. 1) will cause the post 44 to enter the open end of the gap to bring the bracket 51 into engagement with a block 53 at a position P2 oriented adjacent the opening 41 to cause the upstanding post 44 to be tilted about the axis of the axle 46 in the direction of the arrow A4 and to cause the horizontally extending rod 47 to move through the opening 41 to a position beneath the platform surfaces 32 and 33. While the post 44 is in the position beneath the plane of the platform surfaces 32 and 33, the carriage 43 is moved from its leftmost position P2 in FIG. 10 through an intermediate position P3 thereof to its initial position P1 as illustrated in FIG. 10. The width of the opening 41 is slightly greater than the dimension of the elongated rod 47 mounted on the upstanding post 44 so as to easily facilitate the aforementioned movements. It will be readily apparent to those skilled in the art that the elongated rod 47 will move from the position P1 illustrated in FIG. 10 to the position P2 while being oriented above the plane of the platform surfaces 32 and 33.

An adjustable stop 54 is provided in the transfer section 12 and is adjustably positioned on the platform surface 34. Parallel elongated slots 56 are provided on the stop 54 to facilitate a movement of the stop relative to the platform surface 34 in a direction generally parallel with the pathway defined by the arrow A2. A proximity sensor 57 is mounted on the stop 54 and is movable therewith and is adapted to detect the presence of articles that are to be transferred in the transfer section. The adjustable feature embodied within the stop 54 enables the article handling device 10 to accommodate articles of differing size. Fasteners 55 facilitate a locking of the stop 54 to the platform surface 34.

The transfer section 12 includes a further elongated reciprocal actuator 58 mounted on the upper surface of the base plate 17 and extending generally parallel with the actuator 42. The reciprocal actuator 58 includes a carriage 59 adapted for movement lengthwise of the actuator. As with the carriage 43 described above, the carriage 59 also includes an upstanding post 61, however, the upstanding post 61 is fixed to the carriage 59. An elongated rod 62 is fastened to the upstanding post 61 adjacent the upper end thereof. In this particular embodiment, the actuator 58 is oriented to one side of the supporting leg 38 for the platform surface 34. However, the rod 62 is of a sufficient length to extend from the upstanding post 61 to a position adjacent the leftmost edge of the stop 54 as illustrated in FIG. 2. A further horizontally extending post 63 is connected to the carriage 59 and extends rightwardly therefrom. The rightmost end of the post 63 has a laterally extending rod 64 secured thereto, which rod extends through an elongated slot 66 provided in the supporting leg 38 and is generally parallel to the rods 62 and 47 but oriented below a plane containing the rods 62 and 47. In this particular embodiment, the longitudinal axis of the slot 66 is parallel to the plane of the platform surfaces 32, 33 and 34. As a result, when the carriage 59 is moved back and forth along the length of the reciprocal actuator 58, both of the rods 62 and 64 will be moved therewith.

The article reversing section 13 includes a generally S-shaped housing 67 which, in this particular embodiment, includes three spaced and parallel plates 71, 72 and 73, the plates 71 and 72 being connected to each other along one edge 74 by a wall section 76. Similarly, the plates 72 and 73 are connected to each other along an edge 77 by a wall section 78. The wall sections 76 and 78 extend parallel to one another, but are oriented on opposite sides of the housing 67 as illustrated in FIG. 1.

The S-shaped housing 67 is supported for rotational movement on a distal end of an elongated axle 79 supported on bearing structures mounted on the upper surface of the base plate 17, but are not illustrated. The axle 79 is rotationally driven by a rotational actuator 81 mounted on the base plate 17. The actuator 81 is specifically adapted to rotate the housing 67 through 180° intervals, an initial position of the housing 67 being illustrated in FIG. 1. The axle 79 extends beneath the platform surface 34 and beneath the rod 64 extending through the elongated slot 66. A horizontal plane extending through the longitudinal axis of the rod 64 extends midway between the planes containing the plates 72 and 73. Further, the rightmost end of the slot 66 in the supporting leg 38 opens outwardly into the spacing between the plates 72 and 73 as illustrated in FIG. 2. The upwardly facing surface of the plate 72 is coplanar with the platform surfaces 32, 33 and 34 when the housing 67 is in its initial position illustrated in FIG. 1. Further, and as is readily apparent in FIG. 1, the stroke of the actuator 58 is shorter than is the stroke of the actuator 42, the rod 62 moving rightwardly and stopping shortly before the housing 67 whereas the rod 47 moves all the way to the opening 41 in the platform surfaces 32 and 33.

A stop mechanism 82 is provided for limiting the degree of rotation of the housing 67 to the aforesaid 180°. More specifically, the stop mechanism 82 includes an actuator 83 adapted to reciprocate an elongated rod 84 lengthwise of its longitudinal axis to cause a shoe 86 to be moved toward and away from the housing 67, the shoe 86 having a leg 87 extending beneath the plate 72 to limit clockwise rotation of the housing 67 as illustrated in FIG. 1. When the housing 67 is to be rotated, as will be explained in more detail below, the actuator 83 is actuated to draw the shoe 86 and leg 87 thereof leftwardly to enable the actuator 81 to rotate the housing in a clockwise manner. Shortly before the housing arrives at its 180° rotated position, the actuator 83 is again actuated to cause the shoe 86 and leg 87 to move to the right to engage the plate 72 to halt further movement of the housing 67 and to assure a parallel alignment of the upper surface of the plate 72 with the platform surfaces 32, 33 and 34.

The exit section 14 includes a platform surface 88 which, in this particular embodiment, is the rightwardly most portion of the platform surfaces 32 and 33. The exit section 14 includes a further platform surface 89 having an upwardly facing surface, when in the initial position thereof illustrated in FIG. 1, that is parallel with the upwardly facing surface of the plate 73 in the housing 67. The platform surface 89 is elevatable by an elevating actuator 91 mounted on the upwardly facing surface of the base plate 17 and having a rod 92 thereof affixed to the underside of the platform 89. As a result of an actuation of the elevating actuator 91, the platform 89 can be elevated between positions where the upwardly facing surface thereof is coplanar with the upwardly facing surface of the platform surface 88 or the upwardly facing surface of the plate 73 of the housing 67. The exit section 14 also includes an exit ramp 93 having a ramp surface 94 that is coplanar with the platform surface 88 and an inclined ramp surface 96 for providing a transition between the ramp surface 94 and the upwardly facing surface of a conveyor belt 97. The conveyor belt 97 is a part of an auxiliary piece of equipment not forming a part of the invention.

Located along side of the platform surfaces 88 and 89 and the exit ramp 93 there is provided an elongated actuator 98 capable of reciprocating a carriage 99 back and forth in a direction generally perpendicular to the longitudinal axes of the actuators 42 and 58. A rod 101 is secured to the carriage 99 and overlays, in its initial position, the platform surface 88. An actuation of the actuator 98 will cause the carriage 99 and the rod 101 affixed thereto to move from the position illustrated in FIG. 1 to the position illustrated in FIG. 5 wherein the rod overlays the exit ramp 93.

A control device 102 illustrated in FIG. 2 is utilized for sequentially controlling the actuations of the several actuators described above. For example, the control device 102 controls the actuator 29 through the line 103, the actuator 42 through the line 104, the actuator 58 through the line 106, the actuator 81 through the line 107, the actuator 83 through the line 108, the actuator 91 through the line 109 and the actuator 98 through line 111. The proximity sensor 57 is connected to the control device through the line 112.

Figure 1A:
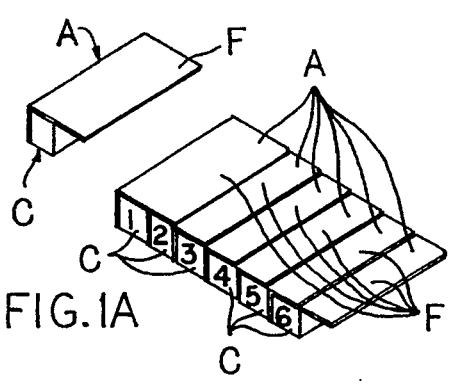
FIGS. 1A–1G are schematic representations of the steps that occur in the inventive article handling device for manipulating a plurality of cartons having flaps thereon so that the flaps on one series of cartons is reversely positioned with respect to the next adjacent series of cartons.
Figure 1B:
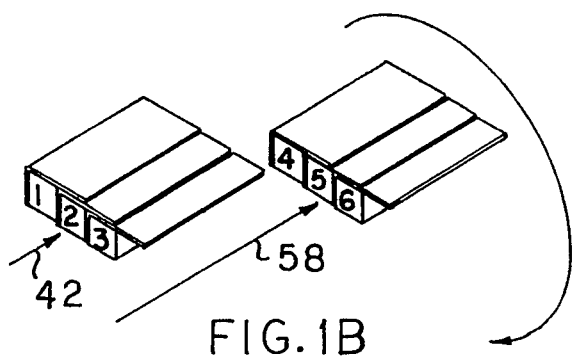

Articles or cartons which are to be handled by the article handling device 10 are illustrated in FIGS. 1A-1G. Each article or carton includes an elongated container part C which includes four sidewalls and two end walls defining a carton having a solid rectangular configuration. In this particular embodiment, and as is illustrated in FIG. 1A, the container part C has a sidewardly extending flap F oriented so that it is coplanar with one of the sidewalls of the container part C. In this particular embodiment, the flaps F enter the entrance section 11 of the article handling device 10 before the container part C. The width and length dimensions of the flap F in this particular carton equals the width and length dimensions of the container part C. When a plurality of articles A enter the entrance section 11 of the article handling device 10, the container parts C abut against the container part of mutually adjacent articles A and the leading flaps F overlap a container part C of the next adjacent and leading article.

It is to be understood that other articles having an identical shape and size, but being different from the size illustrated in FIGS. 1A-1G can be processed by the article handling device 10 described above. An important requirement is that the articles that are to be processed be identical and have one end that is thicker than the other end and enter the article handling device along an entrance path containing a plurality of identically aligned articles, wherein the leading end of each article is of the same thickness. That is, the thickness of the container portion C of the article A is thicker than the thickness of the flap F.

OPERATION

Although the operation of the device embodying the invention has been indicated somewhat above, the operation will be described in detail hereinbelow to assure a more complete understanding of the invention.

FIG. 2 illustrates the initial position of the article handling device 10 when articles A are present in the entrance section 11 and the flap F on the leading article AL is located over the proximity sensor 57 and further articles A are oriented in the housing 67 between the plates 72 and 73, which articles A are inverted with respect to the articles A in the entrance section 11. In this particular embodiment, the number of articles in the housing 67 numbers three. Further, individual articles A will be continually fed into the entrance section 11 one at a time and at a rate that generally exceeds the rate at which articles pass through the article handling device 10 so that there is always assured an ample supply of articles to be processed. If the number of articles A entering the entrance section 11 becomes too great, the control device 102 can be adjusted so as to speed up the cycle to enable a greater number of articles to pass through the article handling device. It is, however, essential that there always be at least two articles, in the disclosed embodiment at least six articles, present in the transfer section 12 so that at least one of them can be transferred by the carriage 43 and rod 47 to the exit section 14, particularly the platform surface 88 and the remaining number transferred by the rod 62 to the spacing between the plates 71 and 72 or vice versa.

Figure 6:
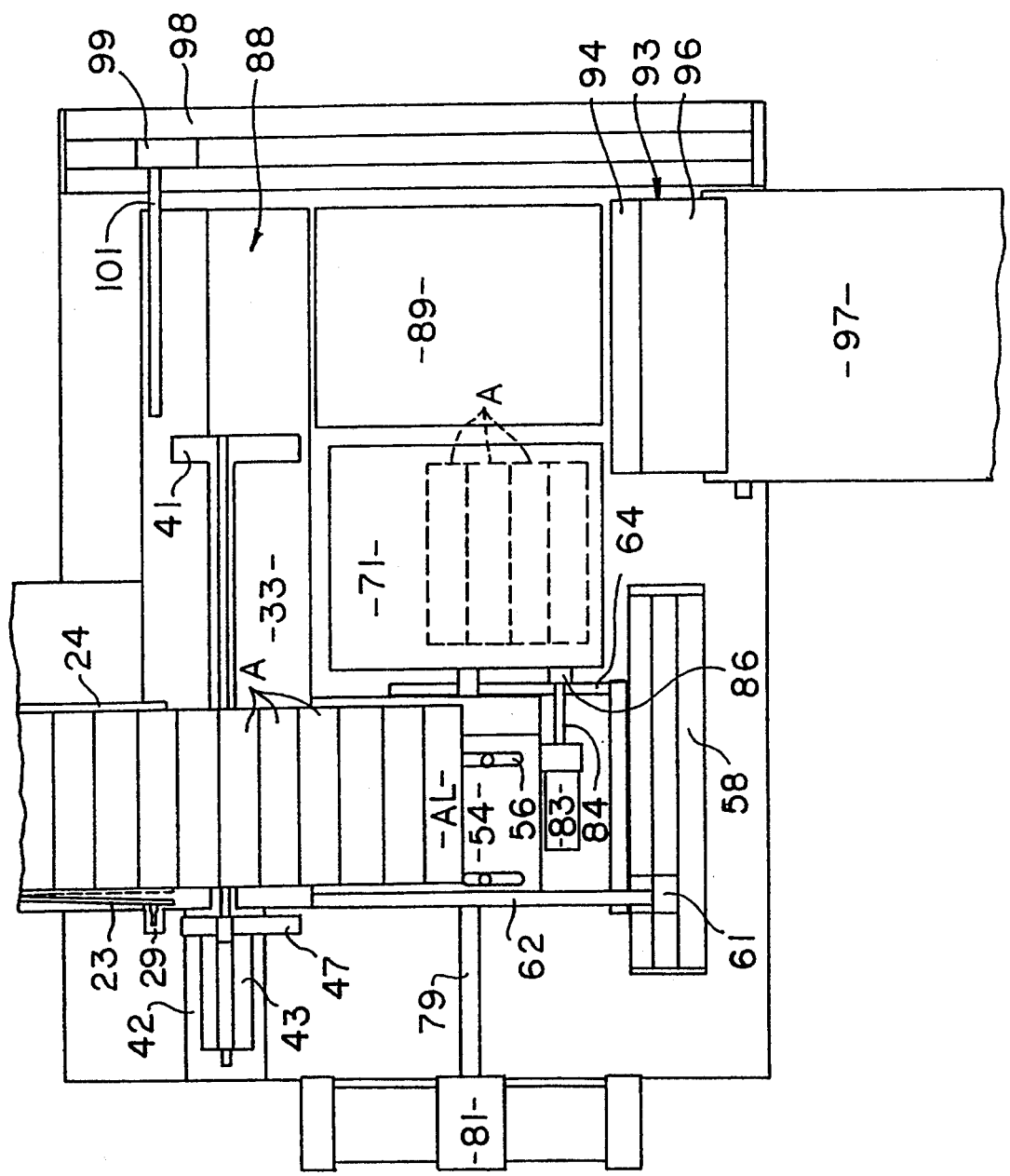
FIG. 6 is a top view of FIG. 2.
Figure 7:
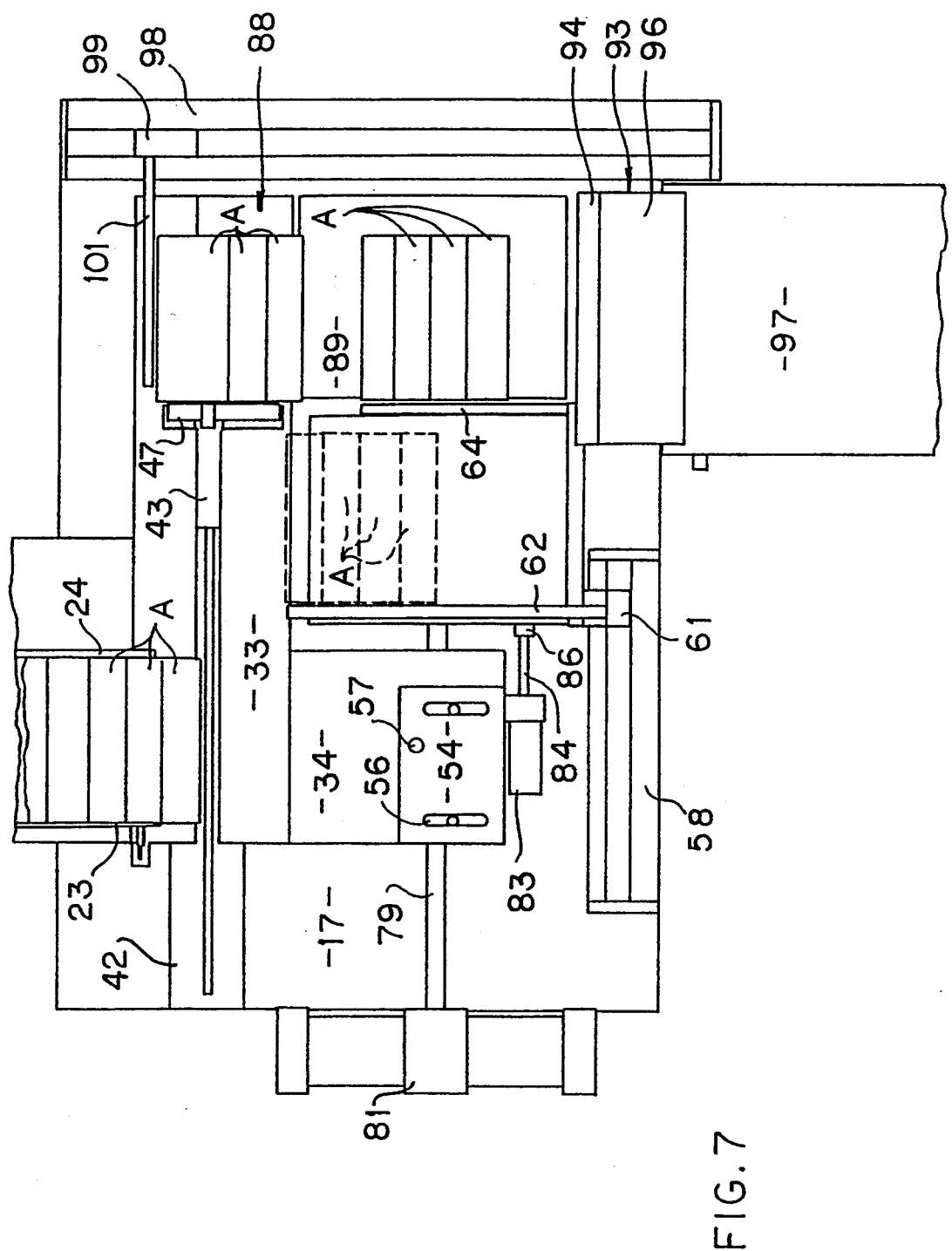
FIG. 7 is a top view of FIG. 3.

Initially, the upstanding guide rail 23 is oriented in the solid line position illustrated in FIG. 6. Simultaneous with the actuation of the actuators 42 and 58, the actuator 29 is also actuated to move the upstanding guide rail to the broken line position thereof illustrated in FIG. 6 to push the articles A up against the stationary guide rail 24. This serves to align the end walls of each of the articles A with each other before further processing thereof is permitted. This movement also effects a holding of the articles not to be transferred toward the exit section 14 from moving prematurely toward the stop 54. This leaves six articles in the transfer section 12 unrestrained.

Subsequently, and since the proximity sensor 57 detects the presence of the flap F on the leading article AL, the control device 102 causes the carriages 43 and 59 to be shifted from the FIG. 2 position to the FIG. 3 position to place a plurality of articles (here three) onto the platform surface 88 in the exit section 14 and a plurality of articles equalling the number of articles on the platform surface 88 into the region between the plates 71 and 72 in the housing 67. Simultaneous therewith, the rod 64 on the carriage 59 will urge three articles A that were previously in the region between the plates 72 and 73 of the housing 67 onto the platform surface 89. As explained above, the articles on the platform surface 89 are all upside down with respect to the articles A on the platform surface 88.

Figure 3:
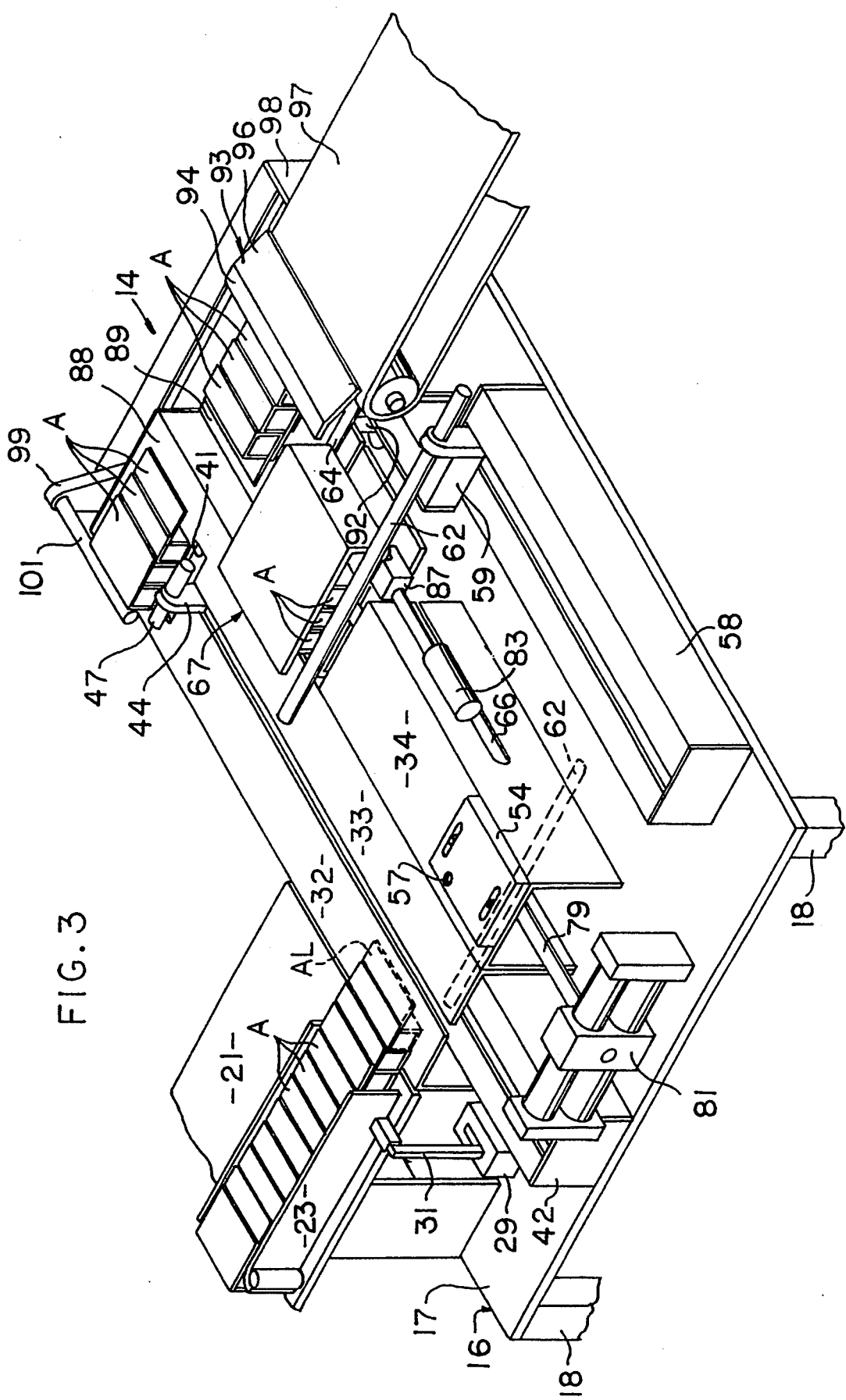
FIG. 3 is an isometric view with the cartons shifted to a different position.
Figure 8:
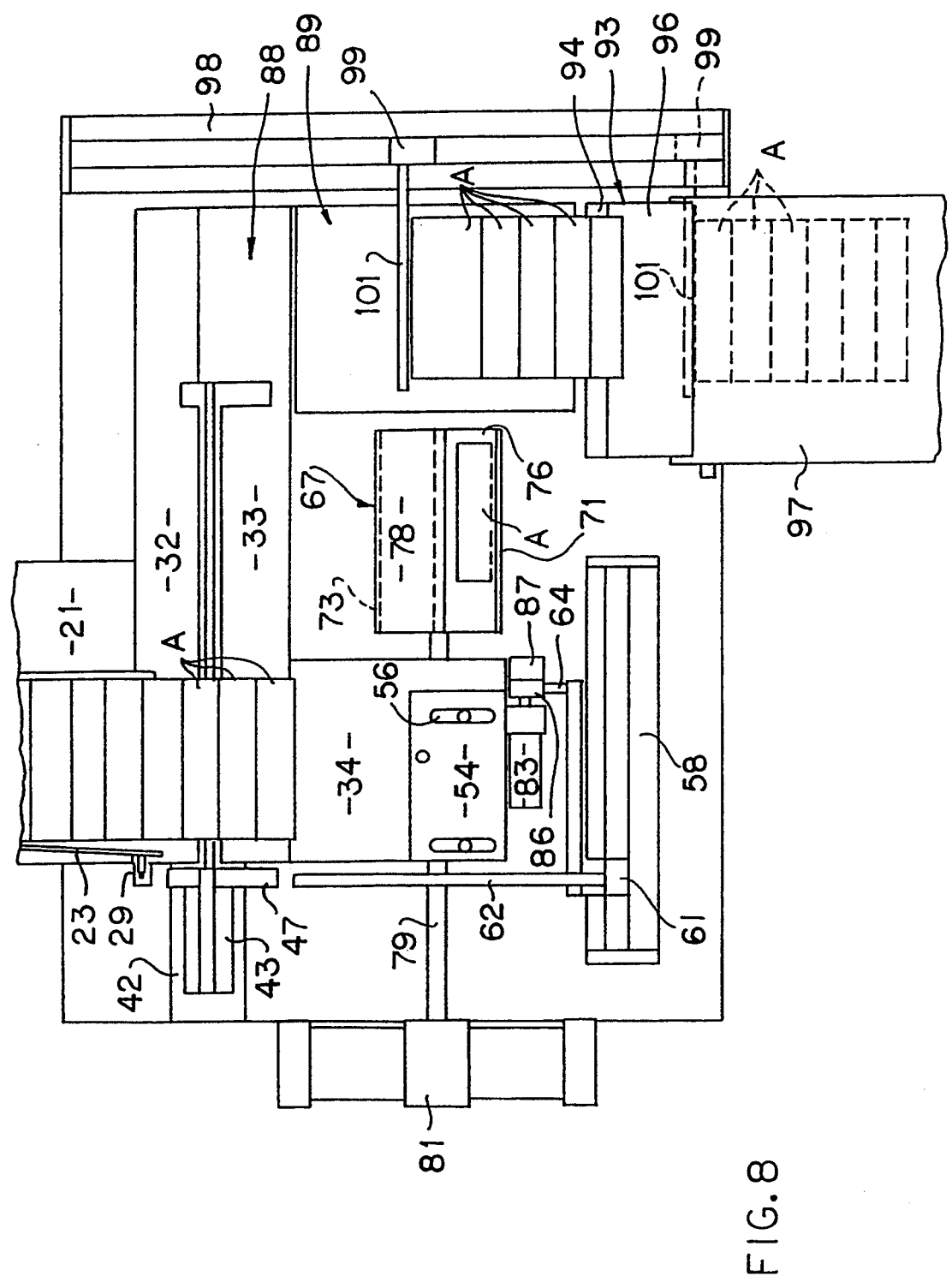
FIG. 8 is a top view of FIG. 4, except that the leading carton in the transfer section in FIG. 4 is engaging the stop.
Figure 9:
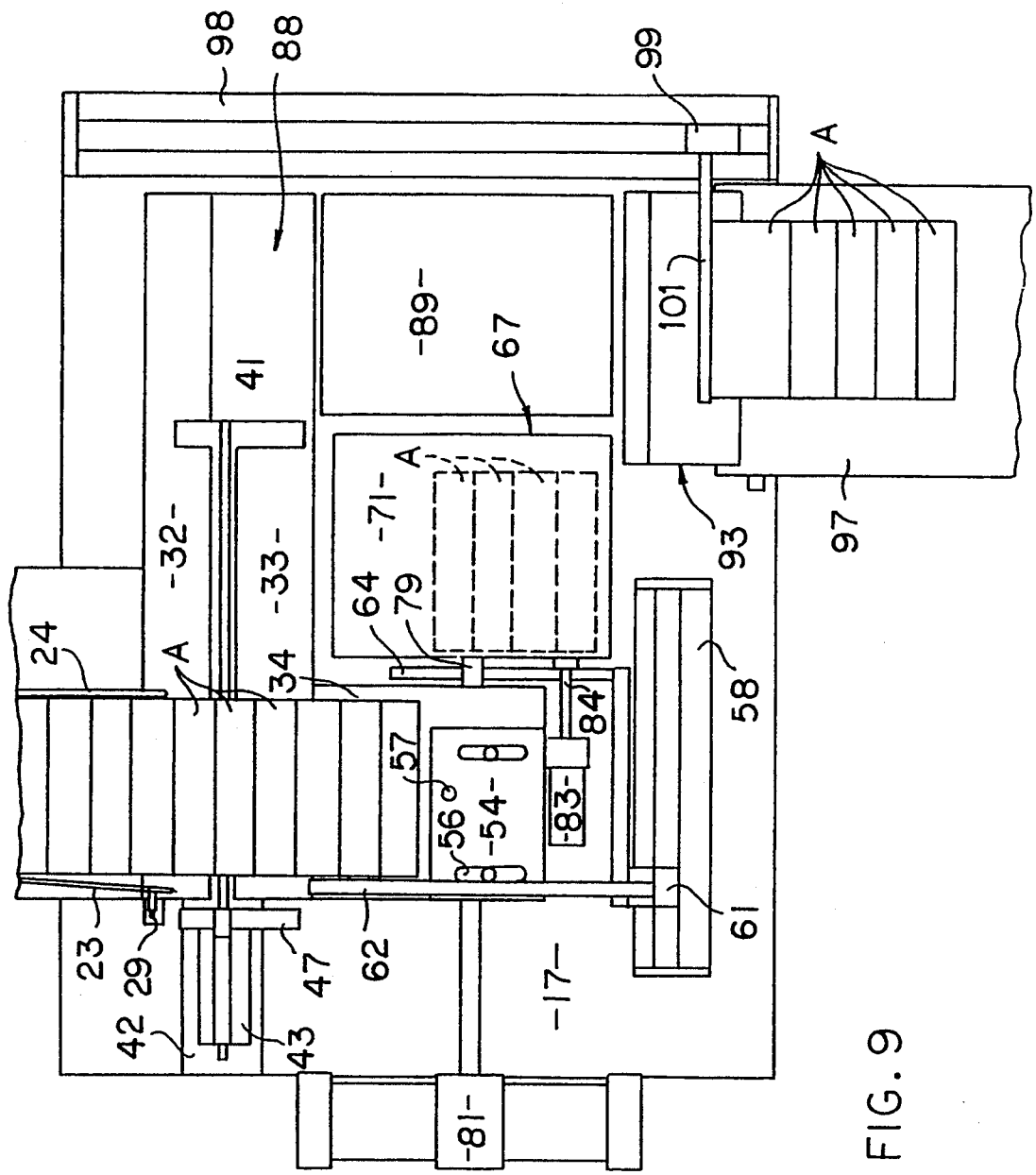
FIG. 9 is a top view of FIG. 5, except that the carton entering the transfer section has not yet reached the position illustrated in FIG. 5.

Following the transfer of articles to the platform surface 88, the upstanding post 44 and rod 47 illustrated in FIG. 3 are immediately caused to drop through the opening 41 by reason of the bracket 51 (FIG. 10) engaging the block 53 as aforesaid. The control device 102 then causes the actuators 29, 42 and 58 to be activated to effect a return stroke causing the upstanding rod 31 of the actuator 29 to return to its initial position illustrated in FIG. 2 and both of the carriages 43 and 59 to return to their initial position also illustrated in FIG. 2. Since the total stroke length of the actuator 58 is substantially shorter than the stroke length of the actuator 42, the rod 62 is returned to its initial broken line position illustrated in FIG. 3 much faster than is the rod 47 returned to its initial position. As a result, and due to a movement of the upstanding guide rail 23 back to its solid line position illustrated in FIG. 8, articles are permitted to move from the entrance section 11 into the transfer section 12 and onto the upwardly facing platform surface 32, as illustrated in FIG. 8, before the carriage 43 reaches its final destination shown in FIGS. 8 and 9. However, since the upstanding post 44 and 47 have been pivoted to a position beneath the platform surface 33, movement of the carriage 43 can take place beneath the articles A entering the transfer section 12 as illustrated in FIG. 8 before the bracket 51 (FIG. 10) on the upstanding post 44 engages the upstanding bracket 52 to cause the post 44 and rod 47 to pivot in direction of the arrow A3 to the upright position when at the FIGS. 2, 4, 5, 6, 8 and 9 positions.

Figure 4:
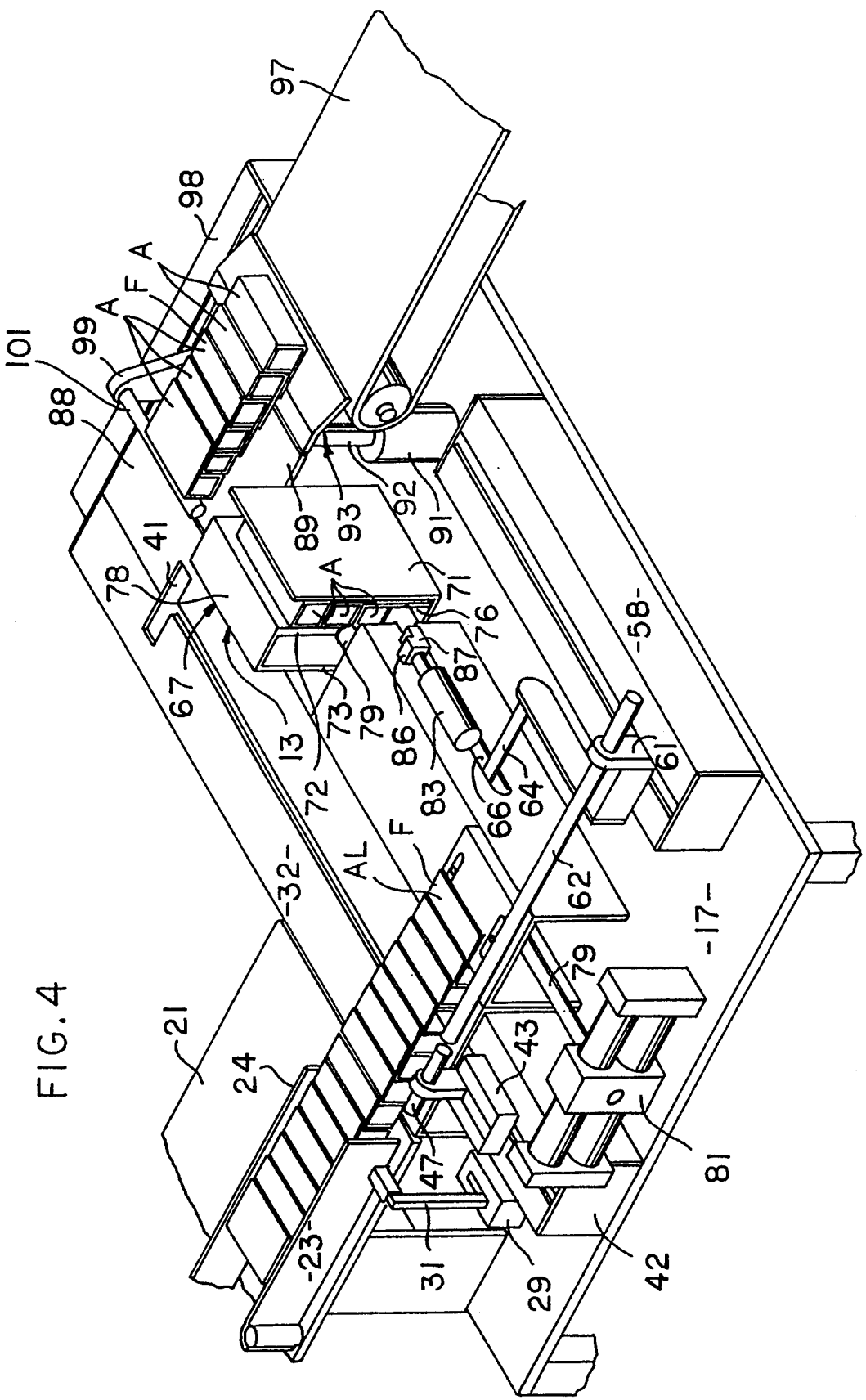
FIG. 4 is an isometric view similar to FIG. 3, but with the cartons shifted to a still different position.
Figure 5:
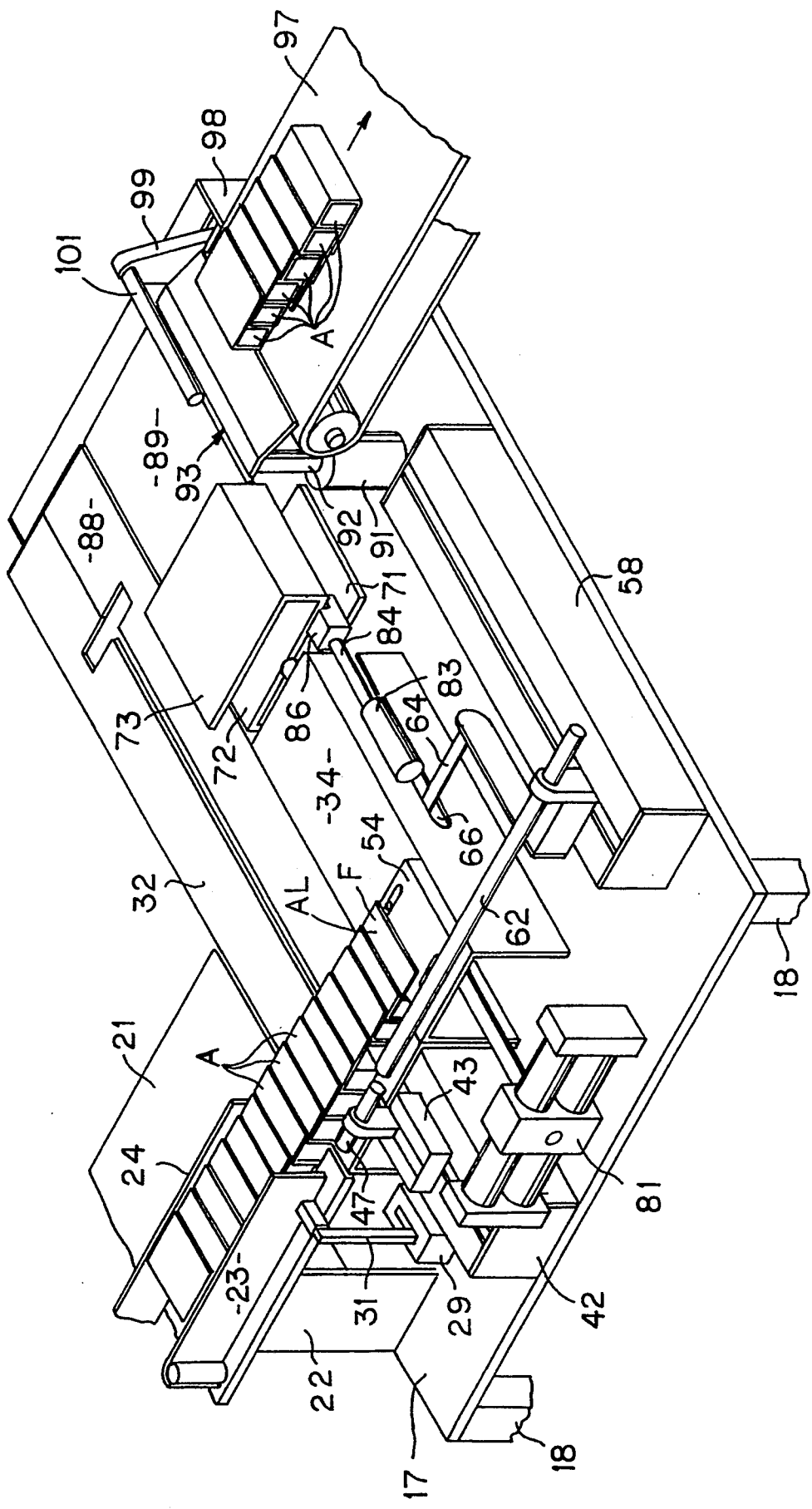
FIG. 5 is an isometric view similar to FIG. 4, but with the cartons shifted to a still different position thereof.

During a return stroke of the actuators 29, 42 and 58, the actuator 83 is activated to retract the shoe 86 and leg 87 from beneath the plate 72 and immediately thereafter the actuator 81 is actuated to cause the housing 67 to rotate in a clockwise direction as illustrated in FIG. 4. Also simultaneous with a return stroke of the actuators 29, 42 and 58, the elevator actuator 91 is activated to lift the platform surface 89 vertically to bring the articles A located thereon to the same level as the articles A on the platform surface 88. Following the arrival of the platform surface 89 to the same level as the platform surface 88, as shown in FIG. 4, the actuator 98 is activated to cause the carriage 99 to move forwardly from its initial position illustrated in FIG. 2 toward the exit conveyor 97. At this particular point in time, the flaps F on the articles A that are transferred from the platform section 88 onto the platform section 89 overlap the carton portion C of the articles that were already present on the platform surface 89 and, similarly, the flaps on the articles that were previously on the platform surface 89 overlap the container portion C of the articles coming from the platform surface 88 onto the platform surface 89. As a result, a block of six articles are formed which define a solid rectangular form capable of being easily packaged and with no wasted space. As the actuator 98 continues the movement of the carriage 99 and rod 101 toward the exit conveyor 97, the united articles A will be moved over the ramp surfaces 94 and 96 onto the exit conveyor as illustrated in FIG. 5. Further, the actuator 83 is sequentially activated to return the shoe 86 and leg 87 to its original position just prior to the arrival of the plate 72 at its FIG. 5 position so as to effectively stop the plate 72 so that it will become aligned with the platform surface 34. As a result, the articles that had previously been placed into the space between the plates 71 and 72 of the housing 67 are still between the plates 71 and 72, but the housing 67 illustrated in FIG. 5 is upside down with respect to the housing illustrated in FIG. 2. The actuator 91 is also sequentially actuated to lower the elevatable platform 89 from the position illustrated in FIG. 5 to the position illustrated in FIG. 2. Lastly, the actuator 98 is sequentially actuated for a return stroke to move the carriage 99 back to its initial position as illustrated in FIG. 2. Following the arrival of all of the actuators 29, 42, 58, 83, 91 and 98 at the initial position illustrated in FIG. 2 and following the arrival of a flap F on a leading article AL in an overlying position relative to the proximity sensor 57, the cycle described above will be repeated.

Figure 1C:
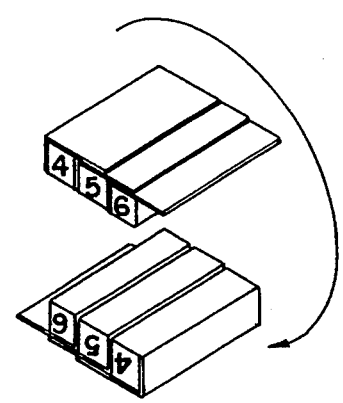
Figure 1D:
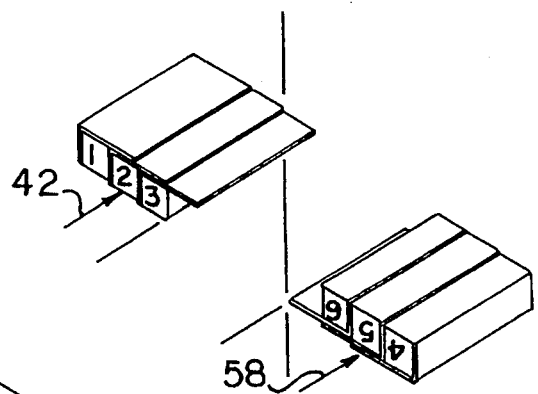
Figure 1E:
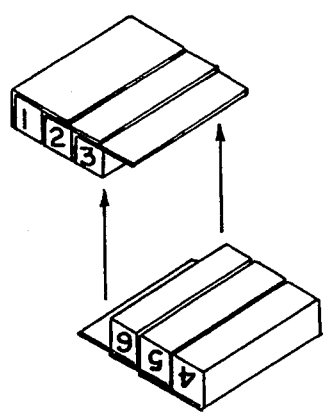
Figure 1F:
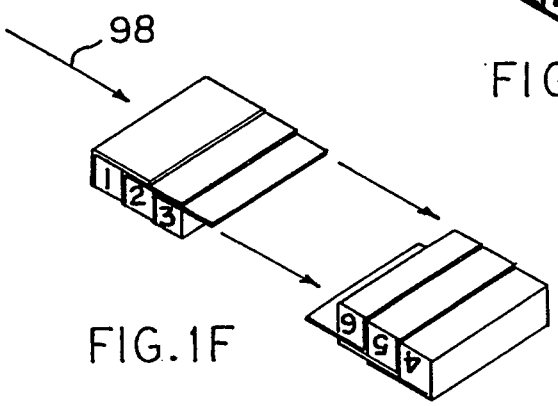
Figure 1G:
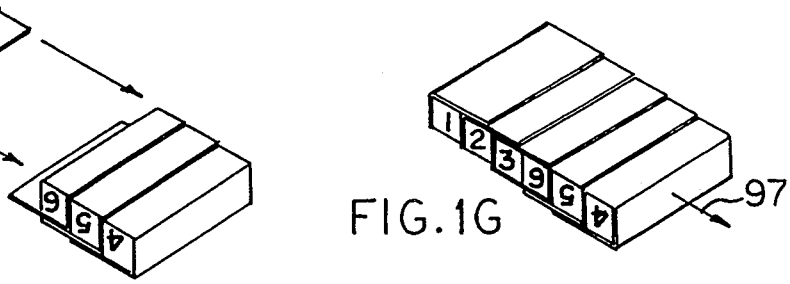

Referring to the schematic illustrations in FIGS. 1A–1G, FIG. 1B shows an arrow that has been marked with the reference corresponding to the actuator 58 to schematically indicate that articles 4, 5 and 6 have been moved into the housing 67. Articles 1, 2 and 3 are moved by the actuator 42 to the exit section 14, particularly onto the platform surface 88 (FIG. 1D). As schematically illustrated in FIG. 1C, articles 4, 5 and 6 are rotated clockwise 180° in the housing 67. As schematically represented by FIG. 1D, the actuators 42 and 58 will bring, respectively, articles 1, 2 and 3 onto the platform surface 88 and upside down articles 4, 5 and 6 onto the platform surface 89. FIG. 1E schematically represents an elevation of the platform surface 89 to bring the upside down articles 4, 5 and 6 up to the same level as the articles 1, 2 and 3 on the platform surface 88. FIG. 1F schematically represents a movement of the articles 1, 2 and 3 by the actuator 98 from the platform surface 88 onto the platform surface 89 and into united engagement with the upside down articles 4, 5 and 6 to thence move the united grouping to the FIG. 1G position corresponding to a movement from the exit section 14 by the exit conveyor 97. Since the united grouping of articles forms a solid rectangular configuration, the united grouping of articles can be easily wrapped in a foil and packaged into a shipping carton.

While the above discussed embodiment discloses a dividing of the articles in the transfer section 12 into two groups of three articles, it is to be understood that the position of the stop 54 can be adjusted on the surface 34 so as to allow more (or less) than six articles to enter the transfer section. For example, it is conceivable that only two articles enter the transfer section 12 so that the united groupings exiting the exit section 14 would contain only two articles, it being understood that only one article would be reversed at a time in the reversing section 13.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An article handling device for handling identical articles having one end that is thicker than the other end entering the device along a supply path containing a plurality of identically aligned articles wherein the leading end of each article is of the same thickness, comprising:
   a frame;
   means on said frame defining an entry path for receiving a single continuous stream of identically aligned articles from the supply path;
   means on said frame defining an exit path laterally spaced from said entry path for receiving a single and intermittent stream of joined together pairs of said articles wherein the leading end of a first article has been reversed relative to the leading end of a second article in the exit path;
   article reversing means intermediate said entry and exit paths for reversing the leading end of said first article relative to the leading end of said second article in the exit path, said article reversing means having an inlet means for receiving a further one of said articles from said entry path and an outlet means for facilitating an egress of said first article whose leading end, when said first article leaves said outlet means, has been reversed from the leading end of said second article as said further article simultaneously enters said inlet means, said article reversing means further including a housing member and rotator means for rotating said housing member about an axis of rotation, said housing member having first and second chambers therein, said first chamber being alternately aligned with said inlet means when said second chamber is alternately aligned with said outlet means and vice versa;
   shuttle means for simultaneously effecting a shifting of at least said second and said further articles laterally from said entry path and at least said first article from said outlet means of said reversing means, said first and said second articles being transferred directly to said exit path whereas said further article is transferred directly to said inlet means of said reversing means; and
   control means for effecting a reversing of the leading end of said further article while said first and second articles exit said device along said exit path.

2. The article handling device according to claim 1, wherein said shuttle means is movable back and forth along a shuttle path oriented between said entry and exit paths, said shuttle path extending generally perpendicular to at least said entry path.

3. The article handling device according to claim 2, wherein said shuttle path extends generally perpendicular to said exit path.

4. The article handling device according to claim 2, wherein said shuttle path extends generally parallel to said axis of rotation.

5. The article handling device according to claim 1, wherein said inlet means and said outlet means are oriented in spaced and parallel planes extending parallel to and on opposite sides of said axis of rotation.

6. The article handling device according to claim 5, wherein said entry path and said exit path are oriented in a common plane.

7. The article handling device according to claim 5, wherein said exit path includes an elevator means for shifting said first article from the plane of said outlet means to the plane of said exit path.

8. The article handling device according to claim 7, wherein said exit path includes a further shuttle means for effecting a shifting of said first and second articles along said exit path, said control means further effecting movement of said elevator means to bring said first article to the plane of said exit path prior to said further shuttle means effecting a shifting of said first and second articles along said exit path.

9. The article handling device according to claim 1, wherein said shuttle means includes a first shuttle member for shifting said second article from said entry path directly to said exit path, and a second shuttle member separate from said first shuttle member for shifting said further article from said entry path to and through said inlet means to one of said first and second chambers of said article reversing means and simultaneously therewith said first article from the other of said first and second chambers to said exit path.

10. The article handling device according to claim 9, wherein said inlet means and said outlet means are oriented in spaced and parallel planes extending parallel to and on opposite sides of said axis of rotation.

11. The article handling device according to claim 10, wherein said entry path and said exit path are oriented in a common plane.

12. The article handling device according to claim 10, wherein said exit path includes an elevator means for shifting said first article from the plane of said outlet means to the plane of said exit path.

13. The article handling device according to claim 12, wherein said exit path includes a further shuttle means for effecting a shifting of said first and second articles along said exit path, said control means further effecting movement of said elevator means to bring said first article to the plane of said exit path prior to said further shuttle means effecting a shifting of said first and second articles along said exit path.

14. The article handling device according to claim 9, wherein said first shuttle member includes a first article engaging member having a width dimension equalling a first multiple of a first width dimension of a single article so that a plurality of second articles is shifted directly to said exit path;

wherein said second shuttle member includes a second article engaging member having a width dimension equalling a second multiple of a width dimension of a single article so that a plurality of said further articles is shifted from said entry path to and through said inlet means to one of said first and second chambers of said article reversing means and simultaneously therewith a plurality of said first articles from the other of said first and second chambers to said exit path.

15. The article handling device according to claim 14, wherein said first and second multiples are equal.

16. The article handling device according to claim 15, wherein each of said single articles is an elongated container having a rectangular cross section and a planar flap contiguous and coplanar with one wall of said container, a length and a width dimension of said flap generally equalling a length and a width dimension of said one wall of said container so that said first and second articles on said exit path will form a package rectangular in cross section, each package containing twice said multiple of a single article therein.

17. The article handling device according to claim 16, wherein said multiple is three so that said package contains six of said single articles.

* * * * *